United States Patent [19]
Ripley

[11] 3,725,494
[45] Apr. 3, 1973

[54] TWO-STAGE DEHYDROGENATION PROCESS FOR PRODUCING DIOLEFINS

[75] Inventor: Dennis L. Ripley, Bartlesville, Okla.

[73] Assignee: Phillips Petroleum Company, Bartlesville, Okla.

[22] Filed: Aug. 2, 1971

[21] Appl. No.: 168,464

[52] U.S. Cl. ............................260/680 E, 260/666 A
[51] Int. Cl. ................................................C07c 5/18
[58] Field of Search.....................260/680 E, 681.5 R

[56] References Cited

UNITED STATES PATENTS

| | | | |
|---|---|---|---|
| 2,866,790 | 12/1958 | Pitzer | 260/680 X |
| 3,161,670 | 12/1964 | Adams et al. | 260/680 X |
| 3,270,080 | 8/1966 | Christmann | 260/680 |
| 3,370,103 | 2/1968 | Callahan et al. | 260/680 |
| 3,448,162 | 6/1969 | Michaels | 260/680 |
| 3,660,513 | 5/1972 | Davison | 260/680 |
| 3,660,514 | 5/1972 | Cichowski | 260/680 |

Primary Examiner—Paul M. Coughlan, Jr.
Attorney—J. Arthur Young et al.

[57] ABSTRACT

A two-stage dehydrogenation process for producing diolefins from monoolefins wherein the monoolefin stream is first dehydrogenated under non-oxidative conditions, followed by an oxidative dehydrogenation with an iron phosphate catalyst. Isoprene is produced from a feedstream containing isoamylenes by a two-stage dehydrogenation process wherein the necessity of removing hydrogen from the non-oxidative effluent is eliminated through a selective second stage oxidative dehydrogenation stage.

6 Claims, No Drawings

TWO-STAGE DEHYDROGENATION PROCESS FOR PRODUCING DIOLEFINS

This invention relates to the two-stage dehydrogenation of monoolefins to diolefins, more particularly isoamylenes to isoprene. In another aspect, this invention relates to a catalytic, non-oxidative dehydrogenation of an isoamylene-containing feedstream wherein the total effluent of the first stage is oxidatively dehydrogenated with an iron phosphate catalyst in a second stage. Another aspect of this invention is the two-stage dehydrogenation process wherein the molecular hydrogen present, as a result of the dehydrogenation reaction of the first stage, is not removed from the continuous feed to the second stage, nor is it substantially burned in the oxidative dehydrogenation conditions of the second stage.

The process of my invention finds particular utility in the conversion of isoamylenes to isoprene. Accordingly, the invention will generally be discussed hereafter as it relates to the aforementioned process.

In the catalytic dehydrogenation of isoamylenes to isoprene, two separate dehydrogenation equilibria and two different reaction rates are normally encountered. In general, it is found that at operating conditions where efficient and selective dehydrogenation of isoamylenes to isoprene is obtained, the yield of isoprene is low because of the limitation established by the thermodynamic equilibrium. On the other hand, at conditions which would thermodynamically favor high yields of diolefins, the primary dehydrogenation of the olefin to the diolefin is far too severe, resulting in an unduly high yield of cracked gases with poor dehydrogenation reaction selectively.

Straight dehydrogenation processes are limited by the aforementioned thermodynamics to relatively low conversions. However, low conversions may be achieved with relatively good selectivity. An additional limitation is that the heat required by the reaction limits the extent of conversion obtainable in an adiabatic reactor, due to the temperature decrease. In the oxidative dehydrogenation process, because of heat supplied by oxidation, high conversions can be achieved since the thermodynamic limitation allows higher conversion rates. However, disadvantages of the oxidative process are the cost of oxygen necessary and the conversion limitations placed on an adiabatic reactor system by the temperature rise accompanying high conversions.

Some of the disadvantages of both non-oxidative and oxidative dehydrogenation stages can be alleviated by combining the two processes. For example, a conventional dehydrogenation catalyst can be employed in the first stage to give partial conversion with high selectivity and correspondingly small temperature decrease. This stage is followed by an oxidative dehydrogenation stage in which additional conversion is achieved. The combination of the two processes is particularly advantageous when a catalyst is used in the oxidative section which does not oxidize hydrogen to any appreciable extent. The overall process is benefited by the lower oxygen requirements, high conversion, and a less severe temperature profile in the reactor.

The present invention overcomes the aforementioned problems and permits a convenient and advantageous combination of the efficient non-oxidative dehydrogenation process with another equally efficient but oxidative dehydrogenation stage.

Accordingly, it is an object of the present invention to provide a two-stage dehydrogenation process wherein monoolefins are dehydrogenated to diolefins. Another object is to provide a process for the dehydrogenation of isoamylenes to isoprene. Yet another object is to provide a process having high diolefin yield conversion rates and good process efficiencies without the heretofore necessary purification steps.

The process of this invention pertains to a two-stage catalytic dehydrogenation production of diolefins from monoolefins. This process utilizes a non-oxidative dehydrogenation catalyst comprised of potassium carbonate, iron oxide, and chromium oxide for the first phase and an iron-phosphate catalyst for the oxidative dehydrogenation of the second phase. Oxidative dehydrogenation of monoolefins to diolefins has been found to take place without the oxidation of free molecular hydrogen which is present from the first-stage effluent when the iron-phosphate catalyst system is utilized. The total effluent of the first stage, including monoolefin, diolefin, hydrogen, and steam, can be directly passed to the second stage and dehydrogenated by oxidative dehydrogenation. A suitable amount of a molecular oxygen-containing gas is added to the mixture prior to the second stage. If sufficient steam is not already present, a suitable amount of steam is also added to the second stage.

The hydrogen generated in the first-stage effluent does not react in the second stage to any appreciable extent, therefore not causing excessive heat release and temperature rise in the second-stage oxidative process. The hydrogen in the second-stage effluent can be effectively separated for other uses. Moreover, linear pentenes which might be present in the effluent of the first stage are not appreciably dehydrogenated to piperylene in the second stage which utilizes the iron-phosphate catalyst system.

From the above statement of the invention, it is readily apparent that the production of diolefins from corresponding monoolefins can be effected in a manner considerably simpler and more efficient than heretofore disclosed by the art. Thus, in comparing the process of the present invention with that of conventional two-stage operations known to the art, it can be seen that the present process (1) eliminates the necessity of removing hydrogen from the first stage effluent and (2) is relatively unaffected by n-amylenes, for example, present as a result of dehydrogenation of normal pentane in a previous dehydrogenation stage. For example, n-pentenes are converted to only a slight extent and there is very little n-pentadiene formation, thus simplifying isoprene purification. A further advantage of the present process over conventional operations is that the effluent from the first-stage dehydrogenation zone passes in its entirety along with added oxygen and steam, directly to the secondary oxidative dehydrogenation zone, with no substantial change in temperature or pressure.

Among the many olefinic compounds which can be dehydrogenated in the instant process are butene-1, butene-2, pentene-1, pentene-2, isoamylenes, 2-methyl-pentene-1, 3-methyl-pentene-1, 2-methyl-butene-2, hexene-1, hexene-2, 4-methyl-pentene-1, 3,4-dimethyl-pentene-1, 4-methylpentene-2, heptene-1, octene-1, cyclohexene, 3-methylcyclohexene, and cyclopentene. The alkenes can contain from three to ten, preferably four to six, carbon atoms per molecule, inclusive, and the cycloalkenes can contain from four to ten, preferably four to six, carbon atoms per molecule, inclusive. Open chain olefins yield diolefins and, in general, six-membered ring olefins yield aromatic ring compounds, the higher molecular weight open-chain olefins may cyclicize to aromatic ring compounds.

Suitable apparatus known to the art using conventional modes for contacting feedstreams with the selected catalyst can be used in the process of this invention. The basic requirement of the primary dehydrogenation zone is that it converts, as efficiently as possible, the monoolefins into diolefins. Multi-tubular reactors and vessels containing catalyst beds are well known and have been successfully used by the art for such dehydrogenation processes.

The first stage dehydrogenation catalyst used in the present invention can be any of the conventional catalysts generally employed, for example, those containing metals of Groups IVB, VB, VIB, VIII, and oxides of Group VIII metals, e.g., chromia on alumina, vanadia on alumina, nickel on kieselguhr, platinum on alumina, iron oxide on an organic carbonate, and the like. The conditions for the first-stage dehydrogenation zone may vary accordingly within the ranges stated above, depending upon the catalyst chosen.

The first-stage dehydrogenation process is conducted under a temperature range of from about 600° to 1,300°F and under a conventional non-oxidative dehydrogenation zone pressure. A preferred catalyst for the first-stage dehydrogenation is an iron oxide catalyst containing a small amount of chromium oxide as a stabilizer and a small amount of potassium compound as a promoter. In particular, iron oxide should be present in an amount of about 39.0 to about 47.0 percent by weight and chromium oxide should be present in an amount of about 1.0 to about 10.0 percent by weight. Also, the potassium carbonate content of the catalyst should be within the range of bout 51.0 to about 59.0 percent by weight. Within these ranges, the catalyst composition yields a satisfactory selectivity under a suitable temperature requirement as discussed hereinabove, with resultant operating economics and improved catalyst life. The dehydrogenation of the first stage using the catalyst as described hereinabove is generally carried out in the presence of sufficient steam to provide a steam-to-hydrocarbon volume ratio in the range of about 0.1:1 to about 30:1. The total gas hourly space velocity (GHSV) of the hydrocarbon and steam will range from about 100 to about 50,000, preferably from about 500 to about 20,000, volumes of gas per volume of catalyst per hour. The catalyst will slowly lose some activity and will, therefore, periodically require regeneration by conventional means, for example, by contacting with steam-diluted air at elevated temperatures.

The total gaseous effluent from the first-stage dehydrogenation zone, consisting of unreacted isoamylenes, isoprene, hydrogen, and with small amounts of lighter gases and heavier polymerization products, is mixed with from about 0.1 to about 3.0 volumes of a molecular oxygen-containing gas per volume of hydrocarbon contained in the effluent. The effluent is then passed to the secondary oxidative dehydrogenation zone. If sufficient steam is not already present, steam is added to provide a steam-to-organic feed volume ratio in the range of about 0.1:1 to about 100:1. The organic feed space rate can be from about 50 to about 5,000, preferably from about 100 to about 2,500 GHSV. The second dehydrogenation stage is conducted at a temperature of from about 800° to about 1,200°F in the presence of steam, oxygen, and iron-phosphate catalyst system which has the aforementioned advantage of having a high selectivity for the dehydrogenation of isoamylenes and a significant lack of activity for dehydrogenation of n-amylenes, or for the oxidation of free molecular hydrogen.

The iron-phosphate catalyst of the oxidative second-stage dehydrogenation zone is an iron-phosphorus-oxygen catalyst such that the amount of phosphorus present is in excess of the stoichiometric amount required for the phosphorus to react in the form of phosphate ions ($PO_4^{-3}$) with all the iron in the catalyst. Thus, depending upon the valence of the iron, the catalyst has a phosphorus content higher than that calculated for the corresponding iron phosphate compound. The iron with the catalyst compositions can be ferric, ferrous, or ferroso-ferric and will have phosphorus contents higher than that calculated for the corresponding compound containing stoichiometric amounts of phosphorus, as shown in the following Table I.

TABLE I

| Iron Phosphate Compound | Stoichiometric Phosphorus Content, Wt. % |
|---|---|
| Ferric phosphate: $FePO_4$ | 20.5 |
| Ferrous phosphate: $Fe_3(PO_4)_2$ | 17.3 |
| Ferroso-ferric phosphate: ⅓ $Fe_3(PO_4)_2$ + $2FePO_4$ * | 19.6 |

*Considered to be derived from magnetic iron oxide ($Fe_3O_4$ or $FeO \cdot Fe_2BS3$).

Thus, these specific iron-phosphate catalysts are iron-phosphorus-oxygen compositions in which the phosphorus content is generally in the range of from about 1.01 to about 5 times, preferably 1.01 to about 2 times, the stoichiometric amount required to react, in the form of phosphate ions, with all of the iron present, and the atomic ratio of oxygen to phosphorus is in the range of 3:1 to 3.999:1.

Except for the greater-than-stoichiometric quantity of phosphorus, the catalysts can be prepared in a manner of suitable ways, such as by the treatment of iron oxides, iron hydroxides, iron phosphates, or other iron salts with phosphoric acid or by the dry mixing of iron oxides or iron salts with phosphorus pentoxide, and the like. The catalyst of this invention can be used in the form of granules, mechanically formed pellets, or any other conventional form of catalyst. If desired, the catalyst can also be employed with suitable supporting or diluting materials such as silica, alumina, boria, magnesia, titania, zirconia, and the like.

These catalysts can be activated by conventional calcination in air at elevated temperatures and can be used for very long periods of time without reactivation or regeneration. However, if regeneration becomes necessary, it can be accomplished simply by stopping the flow of hydrocarbon feed and allowing the flow of the other components, namely the air and steam, to continue for a sufficient period of time to restore a substantial amount of the catalytic activity.

Additionally, it is preferred to maintain the catalyst in a high state of activity by the continuous or intermittent addition of phosphorus-containing compounds to the catalytic zone to insure the higher-than-stoichiometric level of phosphorus in that catalytic zone. This can be done by addition of very small quantities of compounds such as phosphoric acid, phosphorus pentoxide, or other organophosphorus compounds such as triorganophosphines to the feed mixture. The rate of addition of such phosphorus-containing compounds is that which is sufficient to maintain the desired phosphorus level in the catalyst depending upon the amount of phosphorus which might be lost from the catalyst as measured by the amount of phosphorus found in the steam condensate from the reactor effluent.

The effluent from the secondary dehydrogenation zone, comprising isoamylene, isoprene, hydrogen, lighter gases, and some heavy polymerization products, passes into conventional recovery facilities to separate and recover the total isoprene content from the effluent. Any means accomplishing this is suitable for use in the present process. Unconverted isoamylenes can be recycled to the appropriate stage. An isoprene stream, containing relatively small amounts of piperylene, can be recovered for further purification.

The following examples illustrate the results of operating the subject process for the two-stage dehydrogenation of pure 2-methylbutene-2 to produce isoprene. The examples further illustrate the single-stage, non-oxidative dehydrogenation of pure 2-methylbutene-2 for comparative purposes. Examples I and II, presented in table form, and the corresponding results therein are shown without the intent to limit the scope of the invention. They do, however, demonstrate the feasibility of the inventive process.

The results as illustrated in Examples I and II fully demonstrate the advancement provided to olefin

EXAMPLE I

One-stage non-oxidative dehydrogenation
Catalyst (iron oxide-chromium oxide-potassium carbonate)

| Sample | Time[1] | Temp., °F. | Conv. | Yield | Mod.[2] | \multicolumn{9}{c}{Yield, moles/100 mole 2-MB-2 feed} |
|---|---|---|---|---|---|---|---|---|---|---|---|---|---|---|
| | | | | | | CO | $CO_2$ | $C_2$ | $C_3$ | $C_4$ | 3-MB-1 | 2-MB-1 | 2-MB-2 | Isoprene |
| 1 | 26:45 | 1,200 | 44.4 | 40.8 | 91.8 | | 10.69 | | 0.21 | 1.70 | 3.11 | 21.48 | 30.99 | 40.79 |
| 2 | 27:15 | 1,150 | 43.7 | 41.4 | 94.7 | | 4.96 | | | 1.65 | 3.07 | 21.90 | 31.36 | 41.36 |
| 3 | 27:45 | 1,150 | 44.7 | 42.5 | 95.0 | | 4.95 | | | 1.56 | 3.00 | 21.33 | 30.94 | 42.50 |
| 4 | 28:15 | 1,150 | 45.1 | 42.8 | 94.9 | | 5.03 | | | 1.60 | 2.85 | 21.43 | 30.59 | 42.83 |

See the following table:
- 2-methylbutene-2 GHSV ........ 400.0
- Nitrogen GHSV .............. 2,000
- Steam GHSV ................. 4,800

Two-stage (non-oxidative and oxidative) dehydrogenation
First stage catalyst (iron oxide-chromium oxide-potassium carbonate); second stage catalsyt (iron-phosphate-oxygen)

| Sample | Time[1] | Temp., °F. | Conv. | Yield | Mod.[2] | \multicolumn{9}{c}{Yield, moles/100 moles 2-MB-2 feed} |
|---|---|---|---|---|---|---|---|---|---|---|---|---|---|---|
| | | | | | | CO | $CO_2$ | $C_2$ | $C_3$ | $C_4$ | 3-MB-1 | 2-MB-1 | 2-MB-2 | Isoprene |
| 1 | 3:0 | 1,035 | 67.9 | 56.7 | 83.5 | 10.09 | 34.60 | | 0.84 | 2.23 | 4.59 | 10.96 | 16.56 | 56.66 |
| 2 | 3:30 | 1,035 | 67.9 | 58.1 | 85.5 | 8.22 | 28.78 | | 0.95 | 2.33 | 4.59 | 10.85 | 16.67 | 58.06 |
| 3 | 4:00 | 1,035 | 70.1 | 57.6 | 82.2 | 12.88 | 36.89 | | 1.15 | 2.28 | 4.93 | 9.52 | 15.44 | 57.63 |
| 4 | 4:30 | 1,035 | 70.6 | 57.5 | 81.4 | 14.57 | 38.20 | | 1.12 | 2.41 | 4.43 | 9.70 | 15.24 | 47.48 |

[1] Times are in hrs.:min. total time on stream.
[2] Modivity is a modified selectivity. As used herein, the terms "yield, conversion, and modivity" are based on analyses of gas-phase products for converted hydrocarbons, oxides of carbon, and unconverted feed.
See the following table:

- Hydrocarbon GHSV ....... 400
- Oxygen GHSV ........... 306
- Nitrogen ............. 3,094
- Steam ................ 5,000

[a] The feed for the second stage is the effluent from the first stage after water removal and air and steam addition.

EXAMPLE II

One-stage non-oxidative dehydrogenation
Catalyst (iron oxide-chromium oxide-potassium carbonate)

| Sample | Time[1] | Temp., °F. | Conv. | Yield | Mod.[2] | \multicolumn{9}{c}{Yield, moles/100 moles 2-MB-2 feed} |
|---|---|---|---|---|---|---|---|---|---|---|---|---|---|---|
| | | | | | | CO | $CO_2$ | $C_2$ | $C_3$ | $C_4$ | 3-MB-1 | 2-MB-1 | 2-MB-2 | Isoprene |
| 1 | 79:30 | 1,150 | 48.5 | 45.3 | 93.4 | | 6.25 | | 0.48 | 2.12 | 2.71 | 19.99 | 28.76 | 45.31 |
| 2 | 80:00 | 1,150 | 47.8 | 44.5 | 93.1 | 0.57 | 6.40 | | 0.55 | 1.94 | 3.45 | 20.15 | 28.65 | 44.47 |
| 3 | 80:00 | 1,150 | 48.7 | 45.4 | 93.1 | 0.46 | 6.07 | | 0.54 | 2.14 | 2.72 | 19.96 | 28.64 | 45.35 |
| 4 | 81:00 | 1,150 | 48.8 | 45.3 | 92.9 | 0.58 | 6.62 | | 0.53 | 2.16 | 2.71 | 19.93 | 28.60 | 45.28 |

See the following table:
- 2-MB-2 GHSV ............ 400
- N ................... 2,000
- Steam GHSV .......... 5,000

Two-stage (non-oxidative and oxidative) dehydrogenation
First stage catalyst (iron oxide-chromium oxide-potassium carbonate); second stage catalyst (iron-phosphate-oxygen)

| Sample | Time[1] | Temp., °F. | Conv. | Yield | Mod.[2] | \multicolumn{9}{c}{Yield, moles/100 moles 2-MB-2 feed} |
|---|---|---|---|---|---|---|---|---|---|---|---|---|---|---|
| | | | | | | CO | $CO_2$ | $C_2$ | $C_3$ | $C_4$ | 3-MB-1 | 2-MB-1 | 2-MB-2 | Isoprene |
| 1 | 58:00 | 1,070 | 57.0 | 49.0 | 86.0 | 3.35 | 22.33 | | 1.14 | 2.72 | 4.20 | 14.91 | 23.89 | 49.00 |
| 2 | 58:30 | 1,070 | 54.6 | 46.8 | 85.9 | 3.34 | 21.56 | | 0.93 | 2.65 | 4.49 | 15.76 | 25.34 | 46.75 |
| 3 | 59:00 | 1,070 | 57.1 | 48.1 | 84.2 | 5.31 | 26.96 | | 1.00 | 2.49 | 4.09 | 15.18 | 23.58 | 48.11 |
| 4 | 59:30 | 1,070 | 58.0 | 49.6 | 85.5 | 3.49 | 25.2 | | 0.96 | 2.63 | 4.03 | 14.33 | 23.63 | 49.60 |

[1] Times are in hrs.:min. total time on stream.
[2] Modivity is a modified selectivity. As used herein the terms "yield, conversion, and modivity" are based on analyses of gas-phase products for converted hydrocarbons, oxides of carbon, and unconverted feed.
See the following table:

- Hydrocarbon GHSV ....... 400
- Oxygen GHSV ........... 306
- Nitrogen ............. 30,94
- Steam ................ 5,000

[a] The feed for the second stage is the effluent from the first stage after water removal and air and steam addition.

dehydrogenation by the two-stage (non-oxidative and oxidative) process of the invention. Both conversion and yield rates show desirable advancement when utilizing the two-stage process of the invention. These advancements were accomplished at a less severe temperature profile than could be realized before. Yet, the total effluent of the first stage was oxidatively dehydrogenated with the iron phosphate catalyst in the second stage while maintaining the desirable low temperature profile. Certain modifications of this invention will become apparent to those skilled in the art and the illustrated details disclosed herein are not to be construed as imposing unnecessary limitation on the invention.

What I claim is:

1. A two-stage dehydrogenation process for producing diolefins from monoolefins, comprising:
contacting a monoolefinic feedstream in a first-stage, non-oxidative dehydrogenation zone with a non-oxidative dehydrogenation catalyst selected from at least one of chromia or alumina, vanadia on alumina, nickel on kieselguhr, platinum on alumina, and iron oxide on an inorganic carbonate, and contacting the effluent from the first-stage, non-oxidative dehydrogenation zone with a molecular oxygen-containing gas, steam, and an iron-phosphate catalyst under oxidative dehydrogenation conditions in a second stage.

2. A process according to claim 1 wherein the primary zone non-oxidative dehydrogenation temperature ranges from about 600° to about 1,300°F under a pressure of about 0 to about 500 psig and the oxidative dehydrogenation zone temperature ranges from about 700° to about 1,300°F under a pressure of about 0.05 to about 250 psig.

3. A process according to claim 1 wherein the oxidative dehydrogenation zone has a molecular oxygen-containing gas-to-feed ratio of from about 0.1 to about 3.0 and a steam-to-feed ratio of from about 0.1:1 to 100:1 based upon gas hourly space velocity rates.

4. A process according to claim 1 wherein the iron-phosphate oxidative dehydrogenation catalyst has a phosphorus content of about 1.01 to about 5.0 times the stoichiometric amount required to react with all of the iron present wherein the phosphate is in the form of ($PO_4^{-3}$) ions, and the oxygen-to-phosphorus atomic ratio is in the range of from about 3:1 to about 3.999:1.

5. A process according to claim 1 wherein the first-stage, non-oxidative dehydrogenation catalyst is comprised of potassium carbonate, iron oxide, and chromium oxide.

6. A process according to claim 1 wherein the monoolefinic feedstream is comprised of isoamylenes and the resulting diolefins are comprised of isoprene.

* * * * *